Feb. 20, 1923.
C. G. PFEIFFER
TROUGHING IDLER FOR CONVEYER BELTS
Filed Nov. 25, 1921
1,446,270
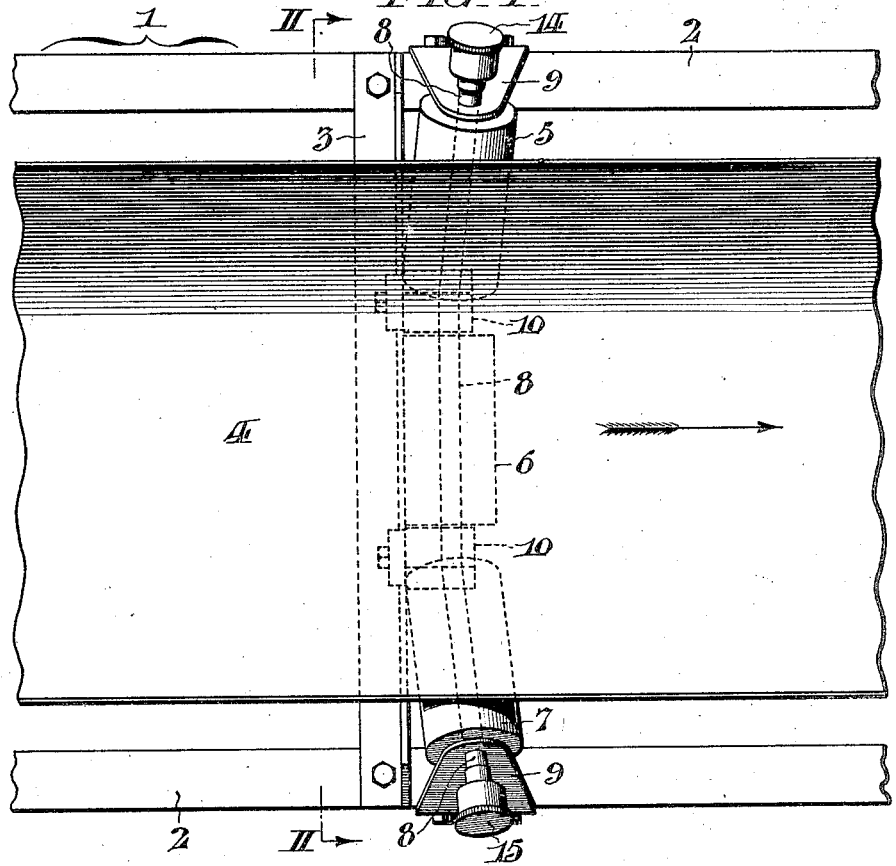
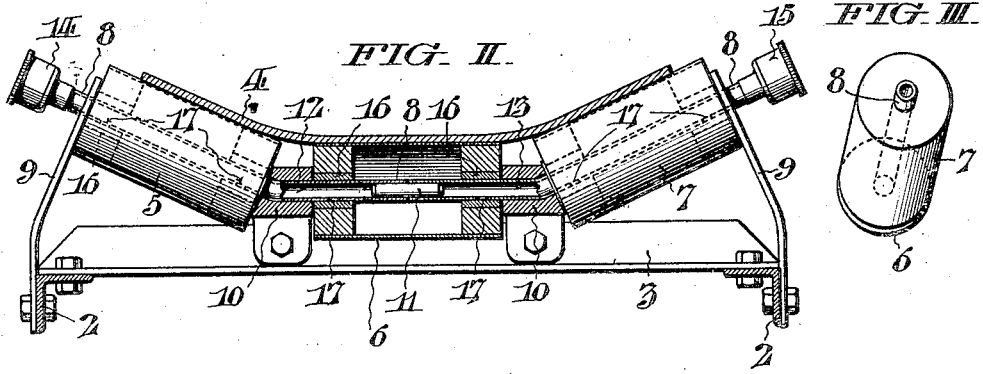

Patented Feb. 20, 1923.

1,446,270

UNITED STATES PATENT OFFICE.

CHARLES G. PFEIFFER, OF PHILADELPHIA, PENNSYLVANIA, ASSIGNOR TO SPECIALTY ENGINEERING COMPANY, OF PHILADELPHIA, PENNSYLVANIA, A CORPORATION OF NEW JERSEY.

TROUGHING IDLER FOR CONVEYER BELTS.

Application filed November 25, 1921. Serial No. 517,533.

*To all whom it may concern:*

Be it known that I, CHARLES G. PFEIFFER, a citizen of the United States, residing in Philadelphia, in the county of Philadelphia and State of Pennsylvania, have invented certain new and useful Improvements in Troughing Idlers for Conveyer Belts, whereof the following is a specification, reference being had to the accompanying drawings.

The invention relates to idlers for conveyer belts of the type which, in addition to sustaining the belt during motion, are further functional in causing the same to be dished or troughed to prevent spilling of the conveyed material beyond its edges.

The invention is primarily directed to an idler structure involving the above characteristics, and capable at the same time, of automatically maintaining the belt properly centralized without the aid of supplemental side guide idlers such as ordinarily employed for the purpose.

The invention is further directed to certain novel details of construction and arrangement whereby assemblage of the idler structure is greatly facilitated, due regard being, at the same time, given to provide for proper lubrication.

The structure by which I attain the ends above pointed out will be best understood from the detailed description which follows.

Referring to the drawings, Fig. I, is a plan view of a portion of a conveyer structure conveniently embodying my invention.

Fig. II, is a cross sectional view along the plane indicated by the arrows II—II, in Fig. I; and Fig. III, is an end elevation showing diagrammatically the manner in which the terminal roller sections of the troughing idler are pitched slightly in advance of the intermediate section.

The conveyer structure herein represented is supported by a frame work 1, comprising parallel, longitudinally running, angle bars 2, 2, which are united in spaced relation at intervals, by transverse tie bars, such as shown at 3. To the supporting structure are attached at corresponding intervals, idlers by which a moving flexible conveyer belt indicated at 4, is guided and sustained, and at the same time dished or troughed laterally as best seen in Fig. II. This idler consists of a series of co-operative roller sections, in the present instance three in number and designated by the numerals 5, 6 and 7. It will be noted that the axes of the terminal roller sections 5 and 7, are inclined to the axis of the intermediate section 6, and also offset or pitched forward in the direction of travel of the conveyer belt 4. This feature may be readily understood by referring to Fig. I, wherein the direction of movement of the belt is indicated by the arrow thereon. See also Fig. III. The roller sections 5, 6 and 7, are mounted for free rotation upon an axle member bent in accordance with the desired disposal of the roller axes. This axle member is supported at its ends by brackets 9, 9, bolted to the sides of the longitudinally running, angle bars 2, 2, of the frame structure 1, and also under the further assistance of supplemental bearing members 10, 10, respectively disposed between adjacent ends of the roller sections and rigidly secured to the transverse bar 3.

Referring more particularly to Fig. II, it will be observed that the axle member is constructed of tubular material, and consists of two counterpart segments having their abutting ends axially alined for the support of the intermediate roller 6, such assemblage being maintained through the instrumentality of a dowel pin plug 11, which overlaps the region of juncture. By the provision of a divided axle member, as above set forth, it will be apparent that assemblage of the structure is greatly facilitated. Furthermore, as a consequence, of this arrangement, it will be seen that the axle member 8, is provided with two separate and distinct axial ducts 12, 13, which are open at the respective ends of the structure, and supplemented with grease cups 14, 15. The lubricant supplied to the ducts by this means automatically finds its way under gravitation, to the bushings 16, at the ends of the roller sections, through communicative openings 17, in the wall of the tube. The bushings 16, are preferably made of a wear resisting composition which readily absorbs and holds the lubricant so that very little attention is required except for the maintenance of an adequate supply in the grease cups.

The idler organization herein disclosed, not only serves to effect the desired troughing of the belt as shown in Fig. II, but also its proper centralization without necessitating the employment of separate supplemental guide idlers ordinarily required for this purpose. The latter desideratum is attained by the forward pitching of the terminal roller sections 5 and 7, of the idler in the directions of travel of the conveyer belt 4, so that the relative angle of approach of the edges of said belt with respect to the said roller sections is made comparatively easier to the advantage that upward creeping of the belt on either side is absolutely prevented.

Having thus described my invention, I claim:

1. A troughing idler for conveyer belts, comprising a series of rollers having relatively inclined and mutually intersecting axes to support and channel a belt and having the marginal rollers in addition inclined in the direction of travel of the belt.

2. A troughing idler for conveyer belts, comprising an axle member formed with an intermediate portion and angularly disposed end portions, means supporting the intermediate portion for rotative adjustment, whereby the axle terminals may be canted to any desired angle by rotation of the axle member in its supporting means, and rollers supported upon the several portions of the axle member.

3. A troughing idler, comprising a series of rollers, and a unitary supporting member adapted to support the rollers in relative angular relation to channel a belt, and to permit projection of the end rollers in the direction of belt travel by adjustment of the supporting member.

4. A troughing idler for conveyer belts, comprising a series of rollers, a unitary tubular axle bent to form angularly disposed roller supporting portions the latter being perforate so that lubricant may be introduced into the axle and fed to the roller supporting portions, and means to support the intermediate portion of the axle for rotative movement whereby the ends of the axle may be canted to any desired angle.

5. A troughing idler for conveyer belts, comprising a pair of angular axle members, having adjacent terminals directed toward each other in alignment, means supporting said terminals for rotative relative adjustment, a roller supported upon said terminals, and rollers supported upon the remote ends of the axle members, whereby the latter may be canted to any desired angle.

6. A troughing idler for conveyer belts, comprising a pair of perforate tubular angular axle members having adjacent terminals in alignment, a pin entering said terminals to connect them, means supporting said terminals for rotative adjustment, a roller mounted upon said terminals for free rotation, rollers mounted on the remote terminals of the axle members, and means for introducing lubricant into the axle members.

7. A troughing idler for conveyer belts, comprising a support, a pair of bearing blocks mounted thereon, a pair of angular axle members having adjacent terminals in alignment and each journalled in one of said bearing blocks, a roller mounted upon the terminals between the bearing blocks, a roller mounted on each remote terminal of the axle members, and bracket plates carried by the support and upholding the remote terminals of the axle members.

In testimony whereof, I have hereunto signed my name at Philadelphia, Pennsylvania, this 22nd day of November, 1921.

CHARLES G. PFEIFFER.

Witnesses:
JAMES H. BELL,
E. L. FULLERTON.